United States Patent
Zhang

(10) Patent No.: US 11,679,635 B2
(45) Date of Patent: Jun. 20, 2023

(54) VEHICULAR TRAILER HITCHING ASSIST SYSTEM WITH COUPLER HEIGHT AND LOCATION ESTIMATION

(71) Applicant: Magna Electronics Inc., Auburn Hills, MI (US)

(72) Inventor: Liang Zhang, Ottawa (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 224 days.

(21) Appl. No.: 17/115,826

(22) Filed: Dec. 9, 2020

(65) Prior Publication Data

US 2021/0170820 A1 Jun. 10, 2021

Related U.S. Application Data

(60) Provisional application No. 62/705,344, filed on Jun. 23, 2020, provisional application No. 62/960,378, (Continued)

(51) Int. Cl.
| | |
|---|---|
| *B60D 1/36* | (2006.01) |
| *B60R 11/04* | (2006.01) |
| *G06T 7/246* | (2017.01) |
| *G06T 7/277* | (2017.01) |
| *G06V 20/56* | (2022.01) |

(Continued)

(52) U.S. Cl.
CPC ............... *B60D 1/36* (2013.01); *B60R 11/04* (2013.01); *G06T 7/248* (2017.01); *G06T 7/277* (2017.01); *G06V 20/56* (2022.01); *B60R 1/00* (2013.01); *B60R 2011/004* (2013.01); *B60R 2300/808* (2013.01); *G06T 2207/10016* (2013.01); *G06T 2207/20081* (2013.01); *G06T 2207/30252* (2013.01)

(58) Field of Classification Search
CPC .......... B60D 1/36; G06T 7/277; G06T 7/248; G06T 2207/10016; G06T 2207/20081; G06T 2207/30252; G06V 20/56; B60R 11/04; B60R 1/00; B60R 2011/004; B60R 2300/808
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Pinalben Patel
(74) *Attorney, Agent, or Firm* — Honigman LLP

(57) ABSTRACT

A vehicular trailer hitching assist system includes a camera disposed at a rear portion of a vehicle and having a field of view exterior of the vehicle, the field of view encompassing at least a portion of a trailer rearward of the vehicle. The camera captures image data representative of the trailer rearward of the vehicle. A control includes a processor operable to process image data captured by the camera. The control, responsive to processing of image data captured by the camera, detects a trailer hitch coupler of the trailer rearward of the vehicle. The control, responsive to detecting the trailer hitch coupler, estimates an initial height and an initial location of the detected trailer hitch coupler. The ECU tracks the position of the trailer hitch coupler in subsequent frames and the ECU selects a current frame and a previous frame of captured image data to refine the initial height.

16 Claims, 15 Drawing Sheets

Related U.S. Application Data filed on Jan. 13, 2020, provisional application No. 62/945,247, filed on Dec. 9, 2019.

(51) Int. Cl.
  *B60R 1/00* (2022.01)
  *B60R 11/00* (2006.01)

(56) References Cited

U.S. PATENT DOCUMENTS

| | | |
|---|---|---|
| 5,949,331 A | 9/1999 | Schofield et al. |
| 6,498,620 B2 | 12/2002 | Schofield et al. |
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,085,261 B2 | 7/2015 | Lu et al. |
| 9,264,672 B2 | 2/2016 | Lynam |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,493,917 B2 | 12/2019 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 11,417,116 B2 | 8/2022 | Joseph et al. |
| 2014/0063197 A1 | 3/2014 | Yamamoto et al. |
| 2014/0085472 A1 | 3/2014 | Lu et al. |
| 2014/0160276 A1 | 6/2014 | Pliefke et al. |
| 2014/0267688 A1 | 9/2014 | Aich et al. |
| 2015/0002670 A1 | 1/2015 | Bajpai |
| 2015/0217693 A1 | 8/2015 | Pliefke et al. |
| 2016/0049020 A1 | 2/2016 | Kuehnle et al. |
| 2017/0050672 A1 | 2/2017 | Gieseke et al. |
| 2017/0174128 A1* | 6/2017 | Hu .............................. G06T 7/74 |
| 2017/0217372 A1 | 8/2017 | Lu et al. |
| 2017/0242443 A1* | 8/2017 | Schuh ................. G05D 1/0257 |
| 2017/0254873 A1 | 9/2017 | Koravadi |
| 2017/0280091 A1 | 9/2017 | Greenwood et al. |
| 2017/0341583 A1 | 11/2017 | Zhang et al. |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2018/0361929 A1* | 12/2018 | Zhang .................... B60D 1/366 |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0241126 A1 | 8/2019 | Murad et al. |
| 2019/0275941 A1 | 9/2019 | Lu et al. |
| 2019/0297233 A1 | 9/2019 | Gali et al. |
| 2019/0329821 A1 | 10/2019 | Ziebart et al. |
| 2019/0340787 A1* | 11/2019 | Ramirez Llanos ....... B60R 1/00 |
| 2019/0347498 A1 | 11/2019 | Herman et al. |
| 2019/0347825 A1 | 11/2019 | Gupta et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0023997 A1 | 1/2021 | Vasoya |
| 2021/0034902 A1 | 2/2021 | Assa et al. |
| 2021/0034903 A1 | 2/2021 | Daga et al. |
| 2021/0078634 A1 | 3/2021 | Jalalmaab et al. |
| 2021/0094473 A1 | 4/2021 | Gali et al. |
| 2021/0170820 A1 | 6/2021 | Zhang |
| 2021/0170947 A1 | 6/2021 | Yunus et al. |
| 2022/0092318 A1* | 3/2022 | Luo ........................ G01S 17/931 |
| 2022/0291387 A1* | 9/2022 | Pacala .................... G01B 11/22 |

* cited by examiner

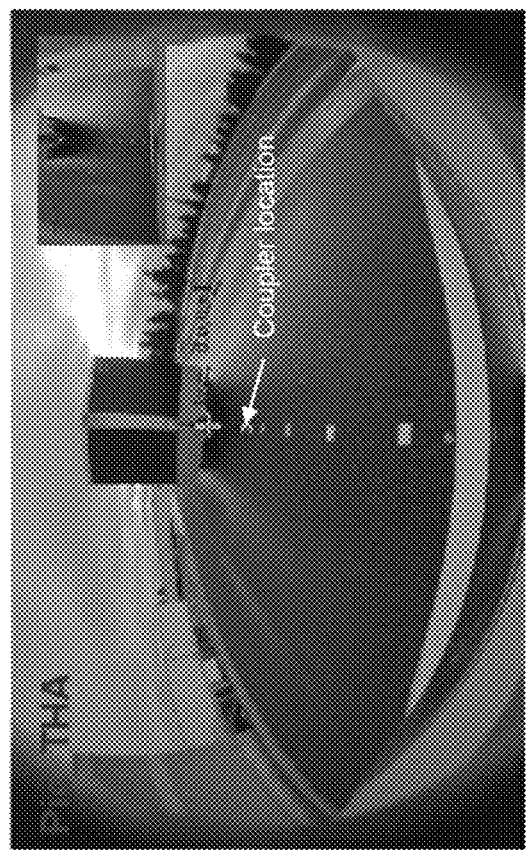
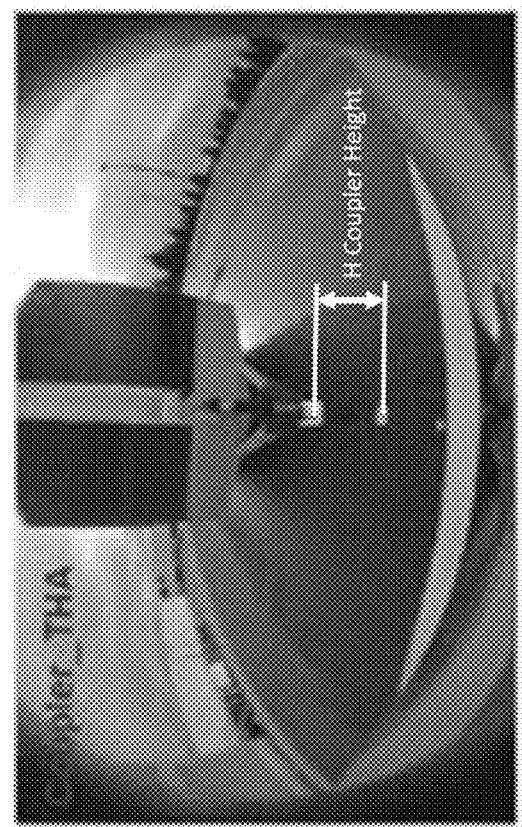
FIG. 2A
FIG. 2B

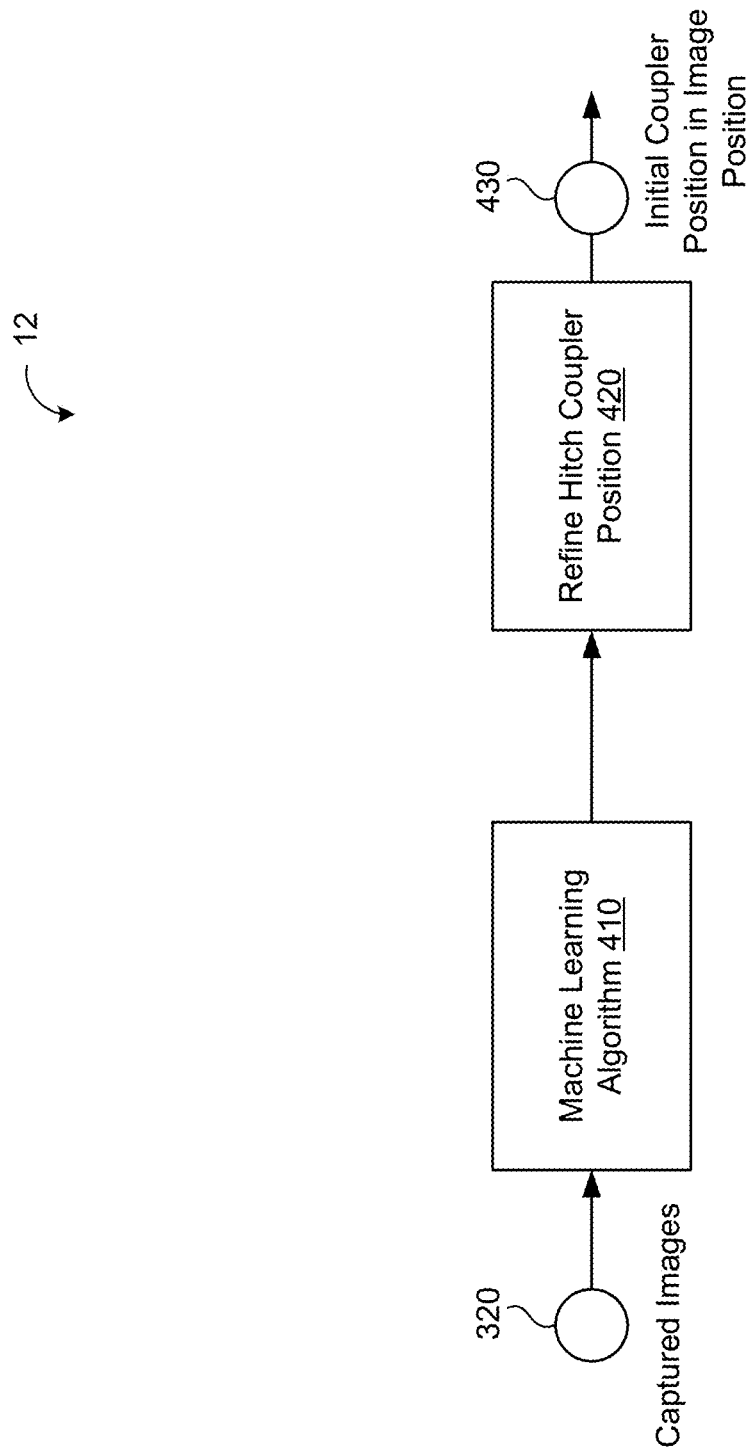

VEHICULAR TRAILER HITCHING ASSIST SYSTEM WITH COUPLER HEIGHT AND LOCATION ESTIMATION

CROSS REFERENCE TO RELATED APPLICATIONS

The present application claims priority of U.S. provisional application Ser. No. 62/705,344, filed Jun. 23, 2020, U.S. provisional application Ser. No. 62/960,378, filed Jan. 13, 2020, and U.S. provisional application Ser. No. 62/945,247, filed Dec. 9, 2019, which are hereby incorporated herein by reference in their entireties.

FIELD OF THE INVENTION

The present invention relates generally to a vehicle vision system for a vehicle and, more particularly, to a vehicle vision system that utilizes one or more rearward viewing cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a driver assistance system or trailering assist system for a vehicle that utilizes one or more cameras to capture image data representative of images exterior of the vehicle, and provides a camera disposed at a rear portion of a vehicle and having a field of view exterior of the vehicle, the field of view encompassing at least a portion of a trailer hitched to the vehicle. The system also includes a control comprising a processor operable to process image data captured by the camera. The image data captured by the camera is representative of the trailer hitched to the vehicle. The control, responsive to processing of image data captured by the camera, is operable to detect a trailer hitch coupler. The control, responsive to detecting the trailer hitch coupler, estimates an initial height relative to the ground and an initial location of the trailer hitch coupler relative to the hitch of the vehicle. The ECU, responsive to detecting the trailer hitch coupler, tracks the position of the trailer hitch coupler in subsequent frames of captured image data as the vehicle reverses toward the trailer. The ECU, responsive to estimating the initial height and the initial location of the detected trailer hitch coupler, selects a current frame of image data and at least one previously captured frame of image data to refine the initial height of the detected trailer hitch coupler relative to ground and the initial location of the detected trailer hitch coupler relative to the hitch of the vehicle.

These and other objects, advantages, purposes and features of the present invention will become apparent upon review of the following specification in conjunction with the drawings.

BRIEF DESCRIPTION OF THE DRAWINGS

FIGS. 2A and 2B are perspective views of images of a trailer captured by a rear-viewing camera of a vehicle;

FIG. 5 is a schematic view of a machine learning algorithm of the trailer assist system;

DESCRIPTION OF THE PREFERRED EMBODIMENTS

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
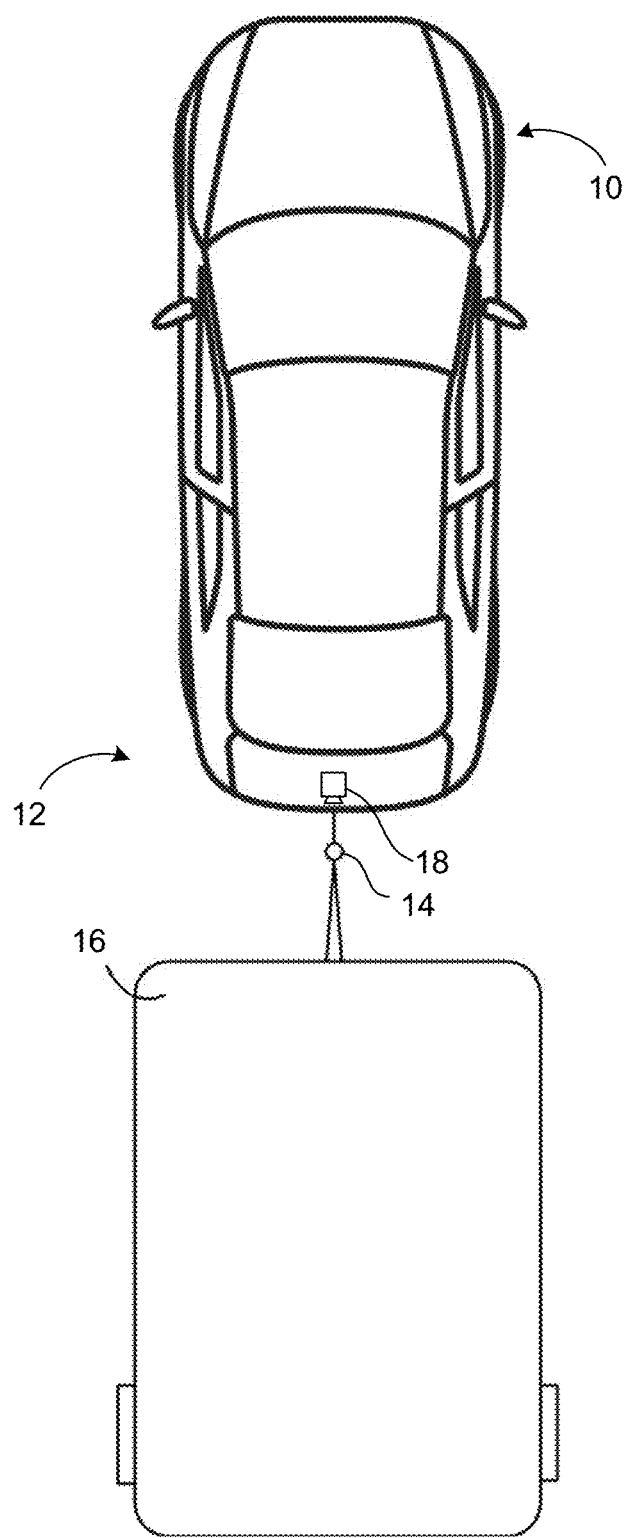
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing with a hitched trailer via, for example, a hitch 14 and may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The cameras may be of any type and/or resolution. For example, one or more of the cameras may be a rear backup camera with at least 1 megapixel resolution. The trailer maneuver assist system 12 includes a control or electronic control unit (ECU) or processor that is operable to process frames of image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Referring now to FIGS. 2A and 2B, trailer assist systems or trailer hitching assist systems, such as a dynamic hitch backup assist system, include key marketable features that aid drivers in trying to line up and attach a trailer to a vehicle. The dynamic hitch backup assist systems typically require information on trailer hitch coupler height (i.e., the trailer hitch coupler's vertical distance from a ground surface) (FIG. 2A) and trailer hitch coupler location (which may be the trailer hitch coupler's horizontal distance from the vehicle or hitch or camera) (FIG. 2B) in order to accurately assist the driver.

For example, to assist with maneuvering a vehicle toward a trailer (i.e., backing up towards the trailer), the trailer assist system may include a rearward-viewing camera on the vehicle that captures images of at least a portion of the trailer while the vehicle is moving. Typically, a trailer includes a tongue at the front of the trailer that ends in a coupler configured to attach to a hitch ball of a hitch of a towing vehicle to form a pivot joint connection between the trailer and the towing vehicle. The portion of the trailer viewed by the rearward-viewing camera may be any part of the trailer. For example, the portion may include any part of the trailer coupler, the trailer tongue and/or tongue jack, and/or the frame of the trailer. The captured image data may be analyzed and processed to retrieve the trailer and trailer hitch coupler information through image processing techniques. The vehicle location may be provided to the trailer assist system via, for example, a Controller Area Network (CAN) bus of the vehicle, and a structure-from-motion technique may be applied to determine a height (relative to the ground) and a location (relative to the hitch of the vehicle) of the target trailer coupler. A structure-from-motion estimation includes a triangulation solution sensitive to accuracy of the camera position and corresponding object features. This requires a robust method to estimate and determine the hitch coupler height and location from the image data or images captured by the rear-viewing camera.

Figure 3:
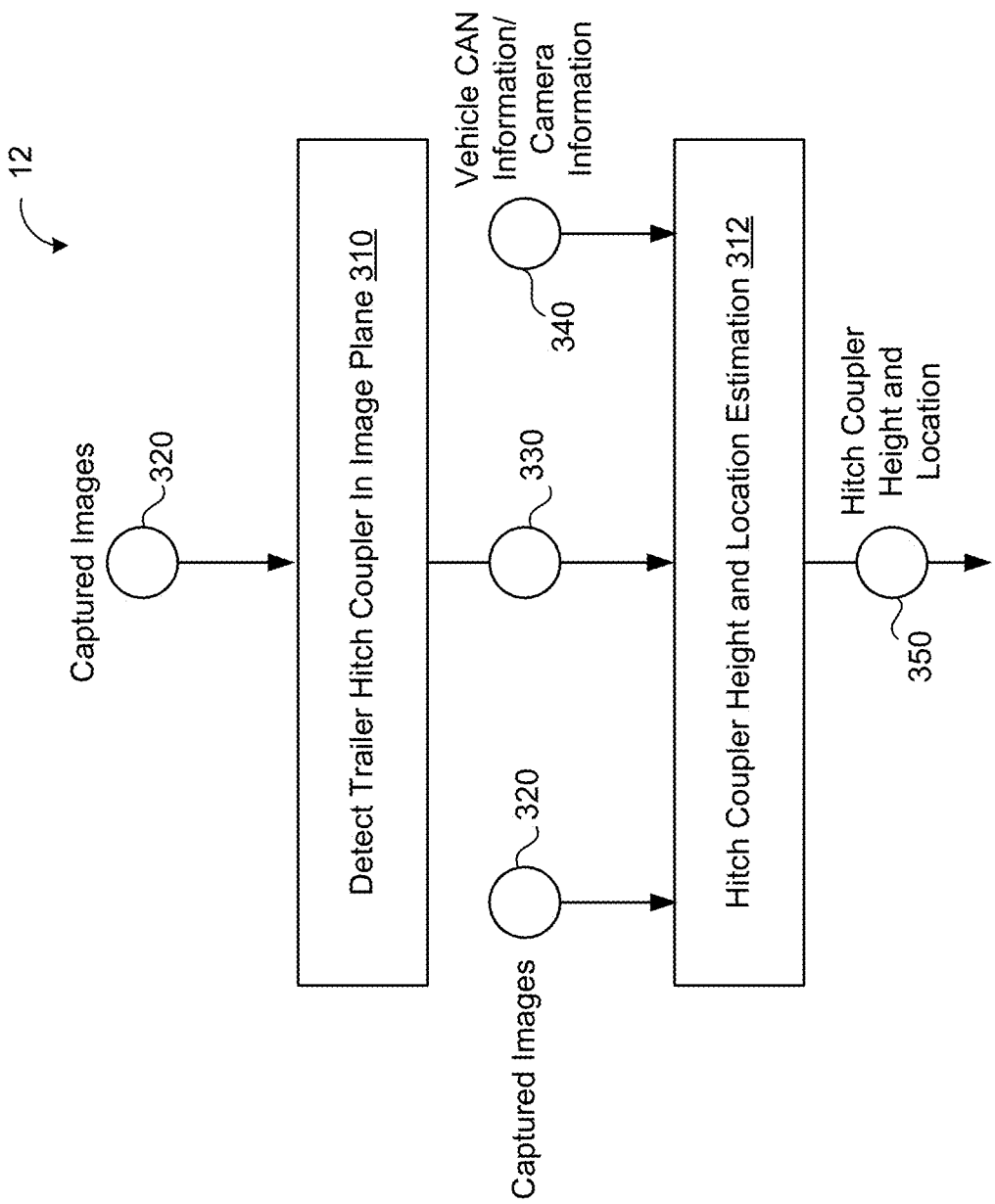
FIG. 3 is a schematic view of a trailer assist system in accordance with the present invention.
Figure 4B:
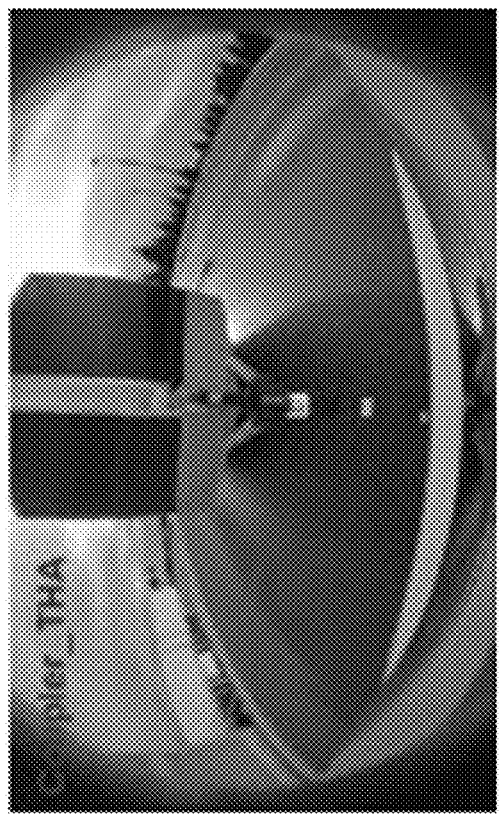
FIGS. 4A-4C are additional perspective views of images of the trailer captured by the rear-viewing camera of the vehicle
Figure 4A:
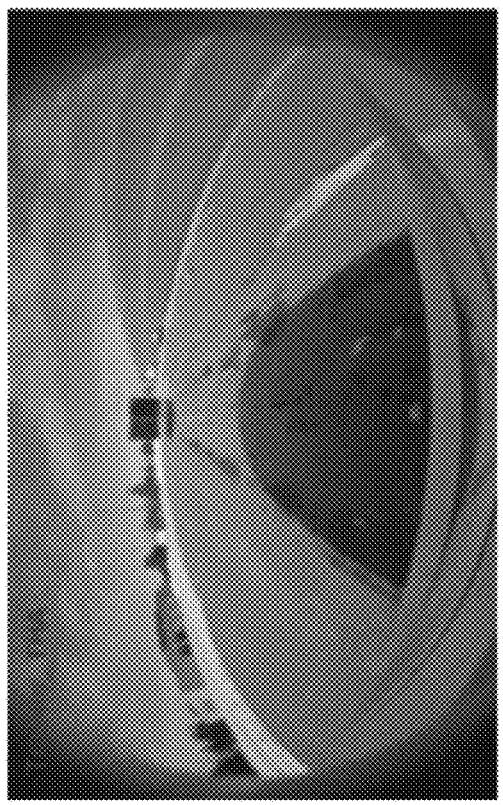
Figure 4C:
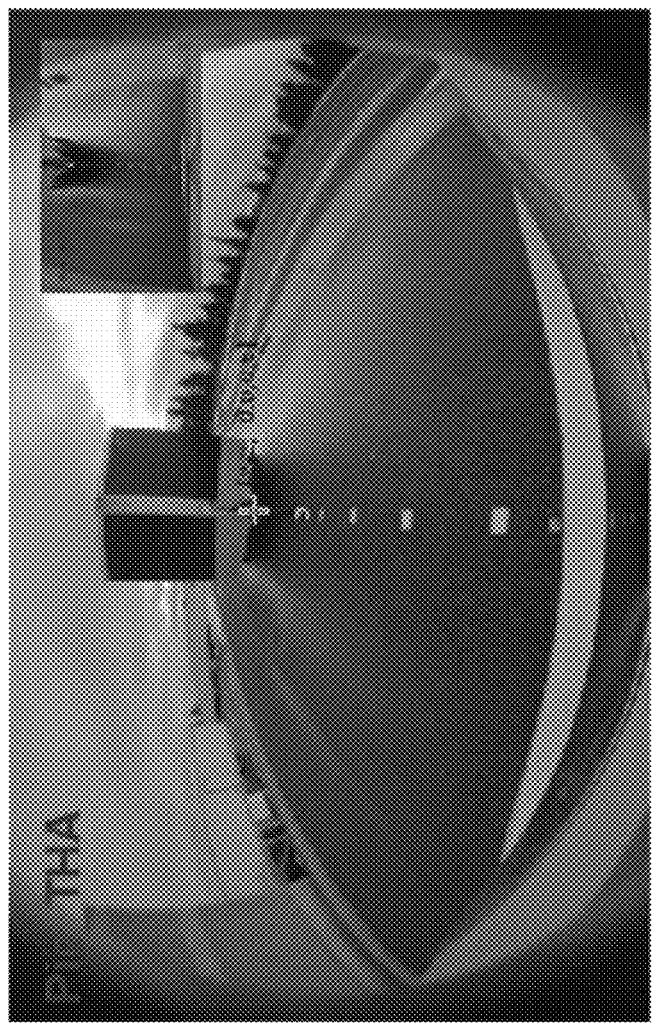

Referring now to FIG. 3, the trailer assist system 12 may include a detector 310 to detect the trailer hitch coupler in an image plane that receives captured images 320 (FIG. 4A) and that outputs the location 330 (FIG. 4B) of the trailer hitch coupler in the image plane. The system 12 may also include an estimator 312 to estimate of the hitch coupler height and location, with the estimator receiving the location 330 from the detector 310, captured image data 320 (e.g., from the rear-viewing camera), and vehicle CAN information and camera information 340. The estimator 312 outputs an estimated hitch coupler height and location 350 (FIG. 4C).

Referring now to FIG. 5, to determine an initial hitch coupler position (i.e., the hitch coupler height and location) in an image plane, such as an image captured by the rear-viewing camera, the trailer assist system 12 may use classification and identification algorithms or methods. For example, the system may use a machine learning algorithm 410 to determine the hitch coupler position 430 in the image plane. The system may apply image processing algorithms 420 to further refine the hitch coupler position 430 to provide an accurate image position.

Figure 6:
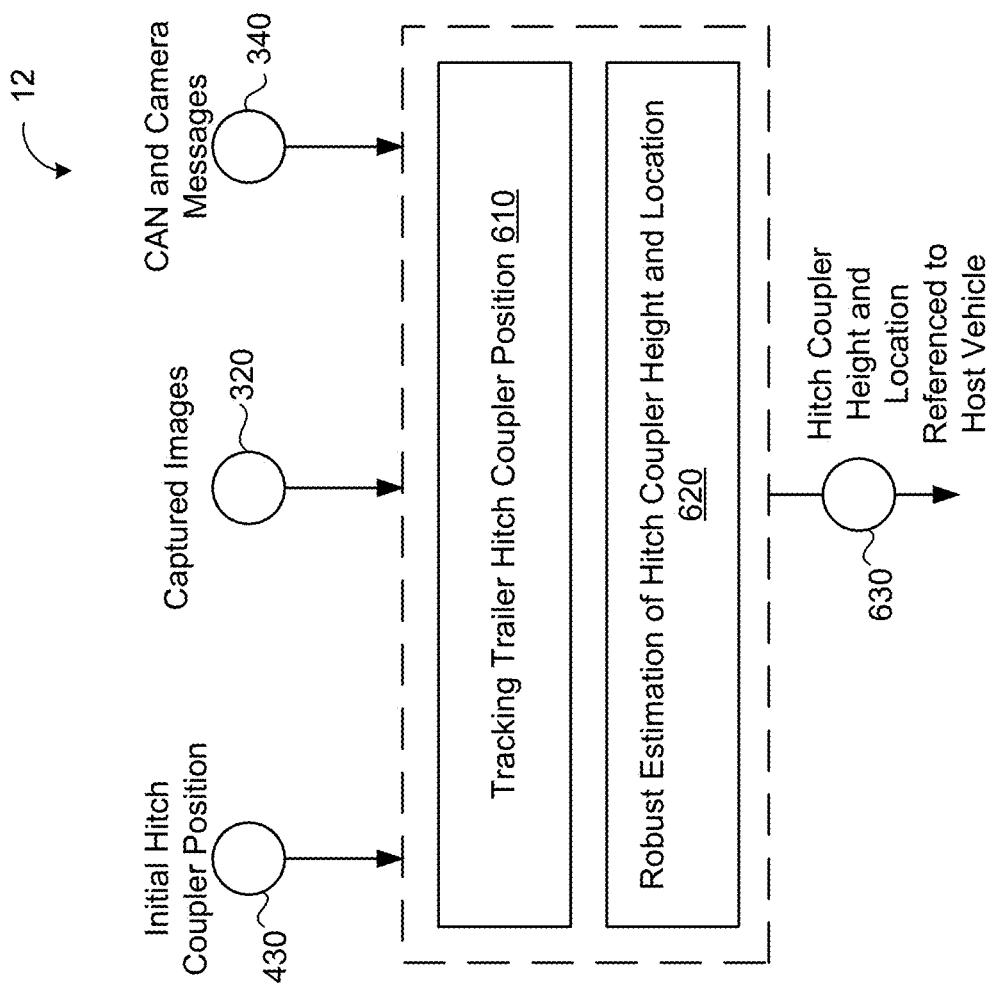
FIG. 6 is a schematic view of a trailer hitch coupler height and location estimator of the trailer assist system.

Referring now to FIG. 6, after the system 12 identifies the initial position 430 of the trailer hitch coupler in the image plane by, for example, the machine learning algorithm 410, the coupler position 430 may be tracked in subsequent frames of captured image data to build a correspondent relationship for coupler height and location estimation as the vehicle reverses toward the trailer to hitch the trailer to the vehicle. This estimation may include two main blocks, as illustrated in FIG. 6, which include a tracker 610 for tracking trailer hitch coupler position and an estimator 620 for robustly estimating the coupler height and location. In some examples, the tracker 610 and/or estimator 620 receive the initial coupler image position 430, captured image data 320, and vehicle CAN and camera information 340 and output a hitch coupler height and location 630 relative to or referenced to the host vehicle for use at a display for example, as shown in FIG. 4C.

Figure 7:
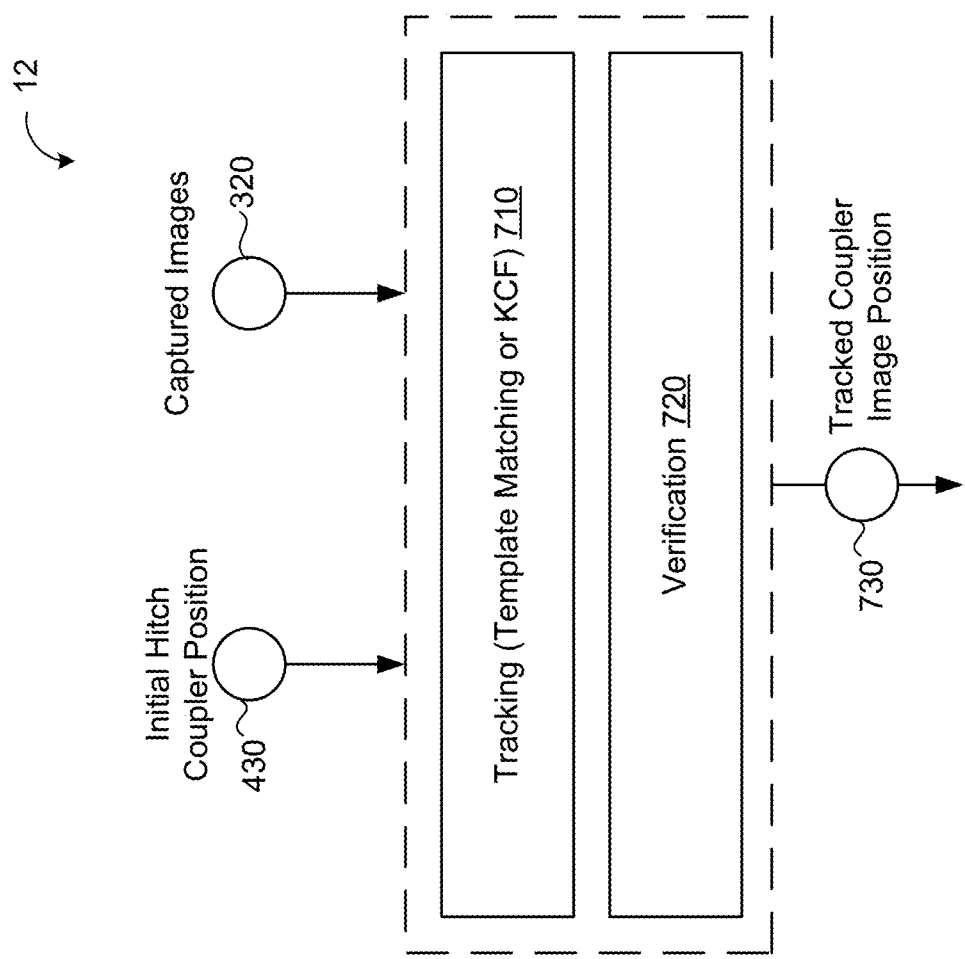
FIG. 7 is a schematic view of trailer hitch coupler tracker of the trailer assist system.

Referring now to FIG. 7, the initial identified coupler image position 430 may be tracked in subsequent frames to build its correspondent relationship. To this end, global or local texture information of one block surrounding the coupler position may be extracted and used for the tracking. There are many mature tracking methods 710 that may be applied here. For instance, a template matching method, as an example of global texture information, may be applied to track the coupler position 430. Another advanced tracking-by-detection method, kernelized correlation filters (KCF), uses local texture information (i.e., descriptors) and may be applied to track the coupler position 730.

In some scenarios, the tracked coupler position is offset from the ground truth position due to image noise and change of coupler's orientation and size. Therefore, a verification step 720 may be used to reject the offset tracking to maintain correctness and accuracy. In the case, where the offset tracking result is rejected, processing for an identification of coupler position 430 may be restarted.

Figure 8:
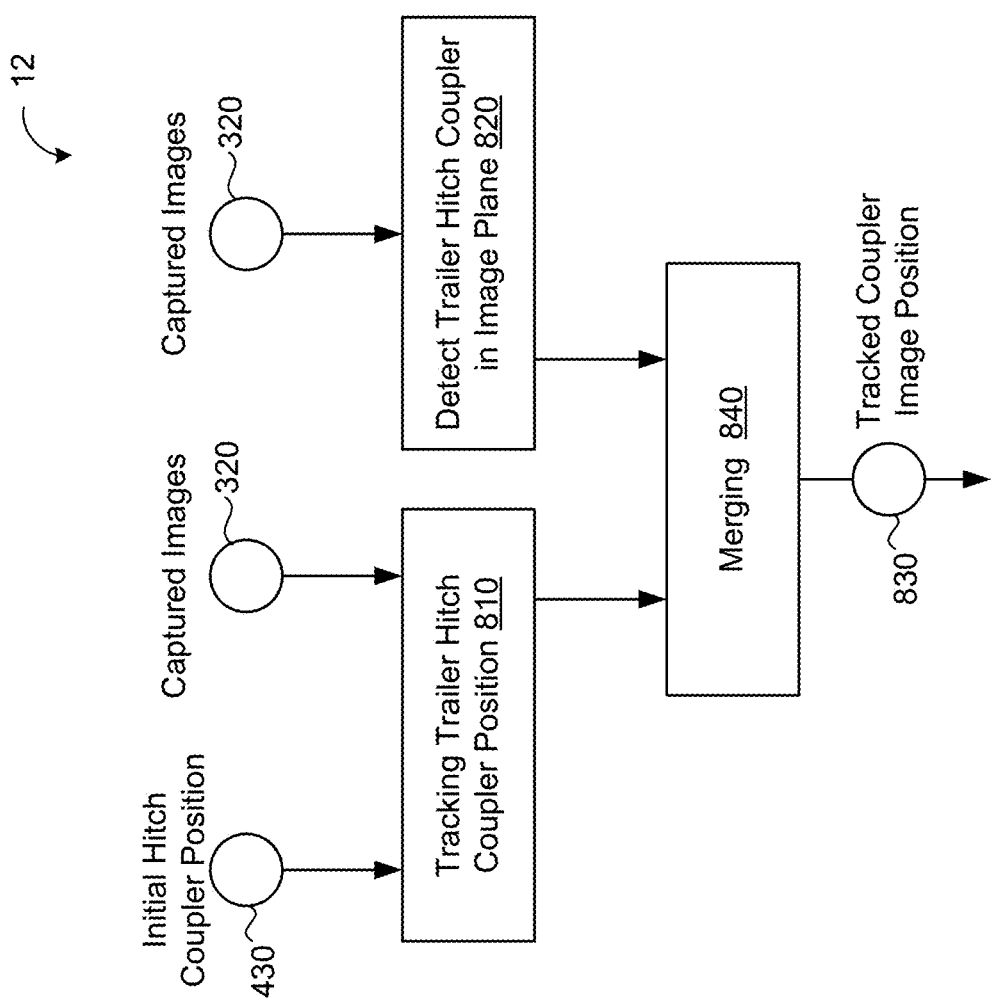
FIG. 8 is a schematic view is another trailer hitch coupler tracker of the trailer assist system.

Referring now to FIG. 8, an alternative to the tracking process illustrated in FIG. 7 is illustrated. In this alternative, parallel to the tracking process 810 in subsequent frames, a process 820 for detecting the trailer hitch coupler image position may be conducted in each following frame. A merging process step 840 may be added to adaptively select or combine the tracked coupler position 810 and/or newly detected coupler position 820. This merged coupler position 830 may represent the final tracked coupler position. This alternative tracking strategy may provide a more accurate, stable and/or consistent coupler position.

Figure 9:
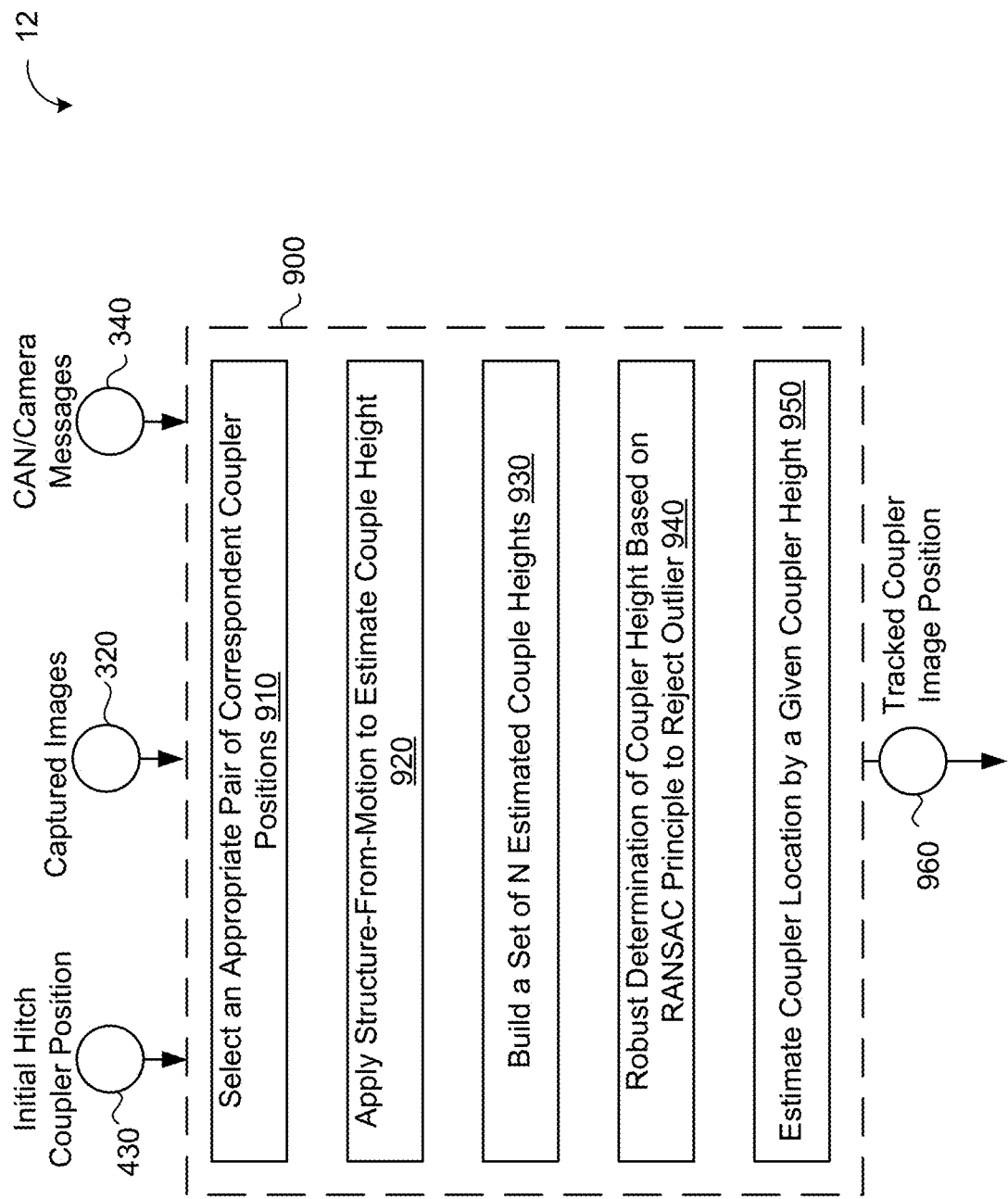
FIG. 9 is a schematic view of a trailer hitch coupler estimator that includes structure-from-motion.

Referring now to FIG. 9, the system may alternatively or additionally output a tracked coupler image position 960 by using a robust estimation 900 that determines the coupler height and calculates the coupler height location. The estimation may include a selector 910 that selects an appropriate pair of correspondent coupler positions from a list of L tracked coupler position in L previous images. One pair of correspondent coupler position comprises one current and one previous coupler position that have sufficient vehicle movement and sufficient image position change.

A structure-from-motion estimator 920 may apply structure-from-motion to estimate coupler height. For example, given the selected pair of correspondent coupler positions ($x_i$ and $x_j$) and the associated camera project matrix ($P_i$ and P), a linear triangulation method may be applied to calculate the height $Z_j$ of the coupler. The project matrix $P_j$ at a select time instance j may be derived from the project matrix $P_i$ based on vehicle movement (R and T) from CAN message at time instance i.

Figure 10:
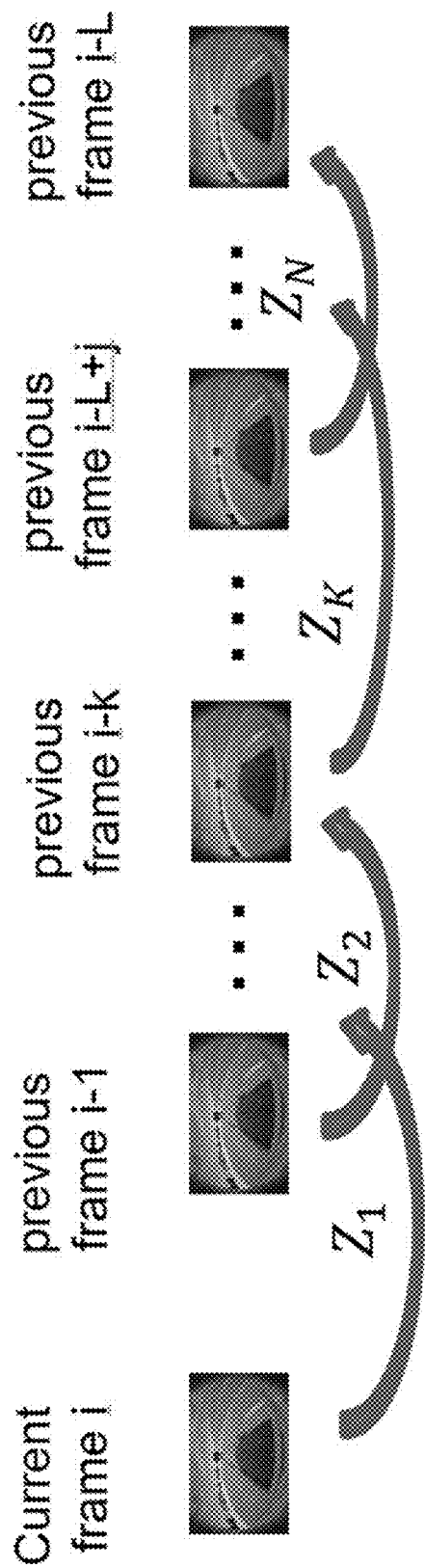
FIG. 10 is a schematic view of a current frame and previous frames of images of the trailer for building a set of candidate coupler heights.

Referring now to FIG. 10, in some examples, a set builder 930 may build a set of N estimated coupler heights. It may be assumed that the ground is a flat surface within a short distance (e.g., a few meters or less). Under this assumption, the height of coupler is the same with reference to the vehicle coordinate system at least within a short distance up to a few meters. Based on this, a set of N estimated coupler heights may be sampled from L previous frames ($Z_1$, $Z_2$, ..., $Z_K$, ..., $Z_N$) by using a structure-from-motion algorithm. For example, and such as illustrated in FIG. 10, each frame is paired with the previous frame (the current frame i with frame i-1, frame i-1 is paired with frame i-2, etc.). This set of N estimated coupler heights may be further processed to provide a final coupler height estimate.

Figure 11:
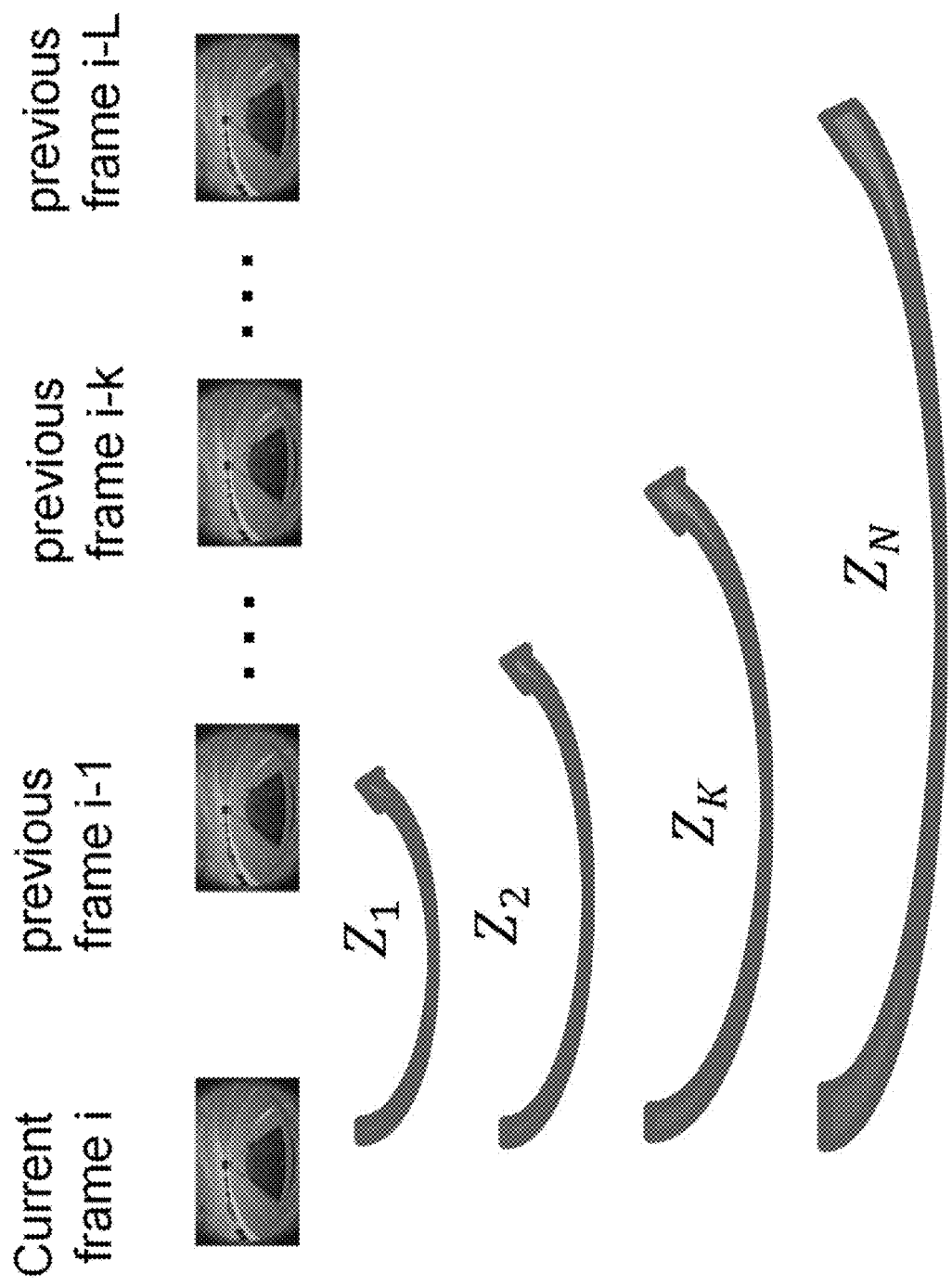
FIG. 11 is another schematic view of a current frame and previous frames of images of the trailer for building a set of candidate coupler heights.

Referring now to FIG. 11, the set builder may build a set of N estimated coupler heights sampled from multiple structure-from-motion estimates in which one feature is always from a current frame and another correspondent feature is selectively from a different (i.e., previous) frame. That is, and such as illustrated in FIG. 11, the current frame is repeatedly paired with different previous frames (i.e., the current frame i is paired with frame i-1, frame i-2, frame i-3, etc.) In this way, it need not be assumed that the ground is a flat surface and all estimated heights of couplers will be the same because the estimated coupler height is referenced to the same coordinate system. The set of N estimated coupler heights may also be sampled from a combination of previous estimates and from the current frame while maintaining the assumption that the ground is a flat surface.

Referring back to FIG. 9, optionally, a robust determination of coupler height may be based on random sample consensus (RANSAC) principles to reject outliers at an outlier rejecter 940. Due to image noise, the coupler image position pair may be inaccurate, which may result in error-prone coupler estimates. To reject the outliers and refine the coupler height estimate, the outlier rejecter 940 may randomly select one coupler height from a set of N candidate coupler heights and calculate the difference e between the selected coupler height and the remaining N−1 coupler heights. The outlier rejecter 940 may, given an error threshold $\in$, find a consensus set M of coupler heights with the condition e<$\in$. In some examples, the outlier rejecter 940 repeats these steps until a given maximum number of random selections or a minimum coupler height number in a single consensus set is met. The outlier rejecter may re-calculate the coupler height using the largest consensus set M to provide an averaged coupler height.

Figure 12:
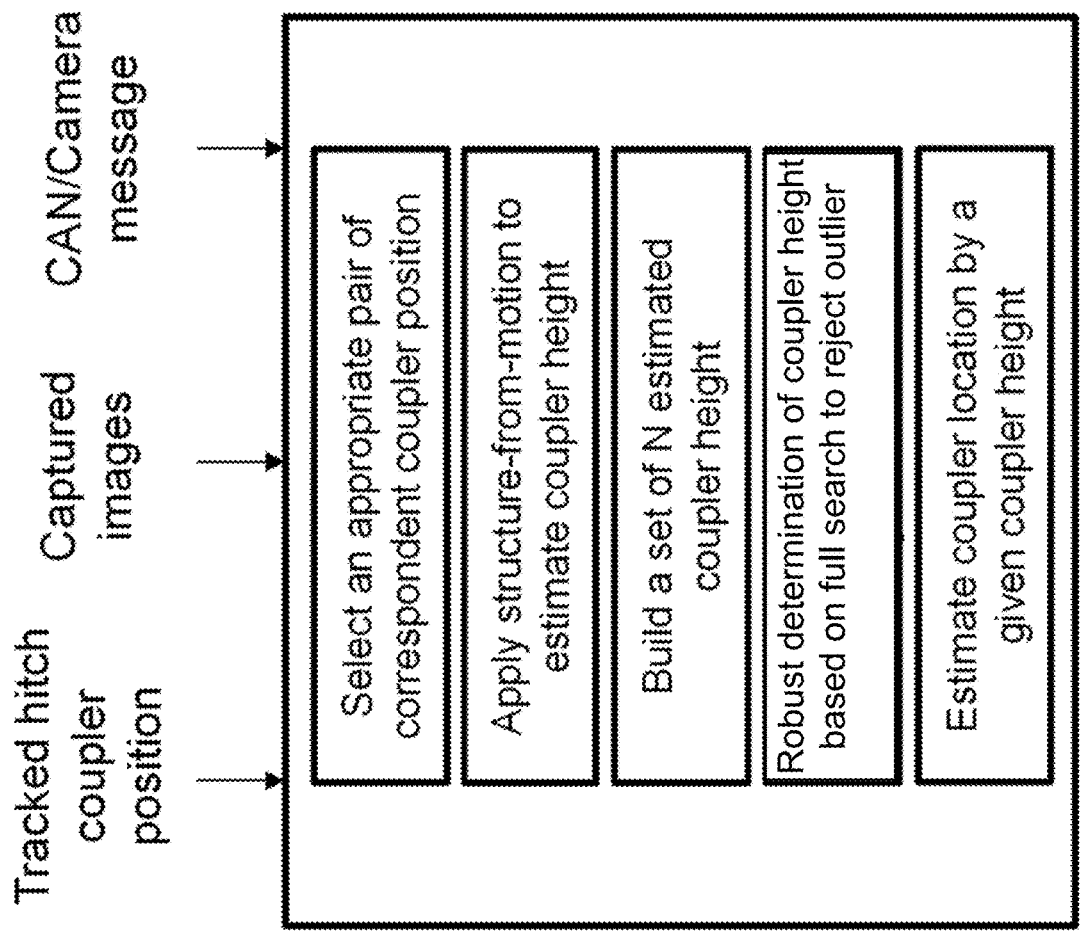
FIG. 12 is a schematic view of a robust estimator in accordance with the present invention.

Referring now to FIG. 12, as an alternative to the RANSAC method, the system may apply a full search strategy or global search method to reject outliers and refine the coupler height estimate. The full search strategy may include a plurality of steps. For example, the steps may include sequentially selecting one coupler height from the set of N candidate coupler heights. Another step may include calculating a difference e between the selected coupler height and the remaining N−1 coupler heights. Give an error threshold E, another step may include finding a consensus set M of coupler heights with the condition e<$\in$. These steps may be repeated until each height estimate from the set of N candidate coupler heights has been selected for a trial and the system may find the largest consensus set M from the N trials. The coupler height may be re-calculated using the largest consensus set M to provide an averaged coupler height.

The robust estimation 900 may also perform a step 950 to estimate coupler location by a given coupler height. With the robust-estimated coupler height $\hat{Z}$ and the coupler image position $x_i$, the coupler location ($\hat{X}_j$ and $\hat{Y}_j$) may be determined through camera projection geometry using Equation (1) and Equation (2), where f is the focal length of a pinhole camera.

$$X_j = \left(\frac{x_j(x)}{f}\right) \times \hat{Z}_j \quad (1)$$

$$Y_j = \left(\frac{x_j(y)}{f}\right) \times \hat{Z}_j \quad (2)$$

Figure 13:
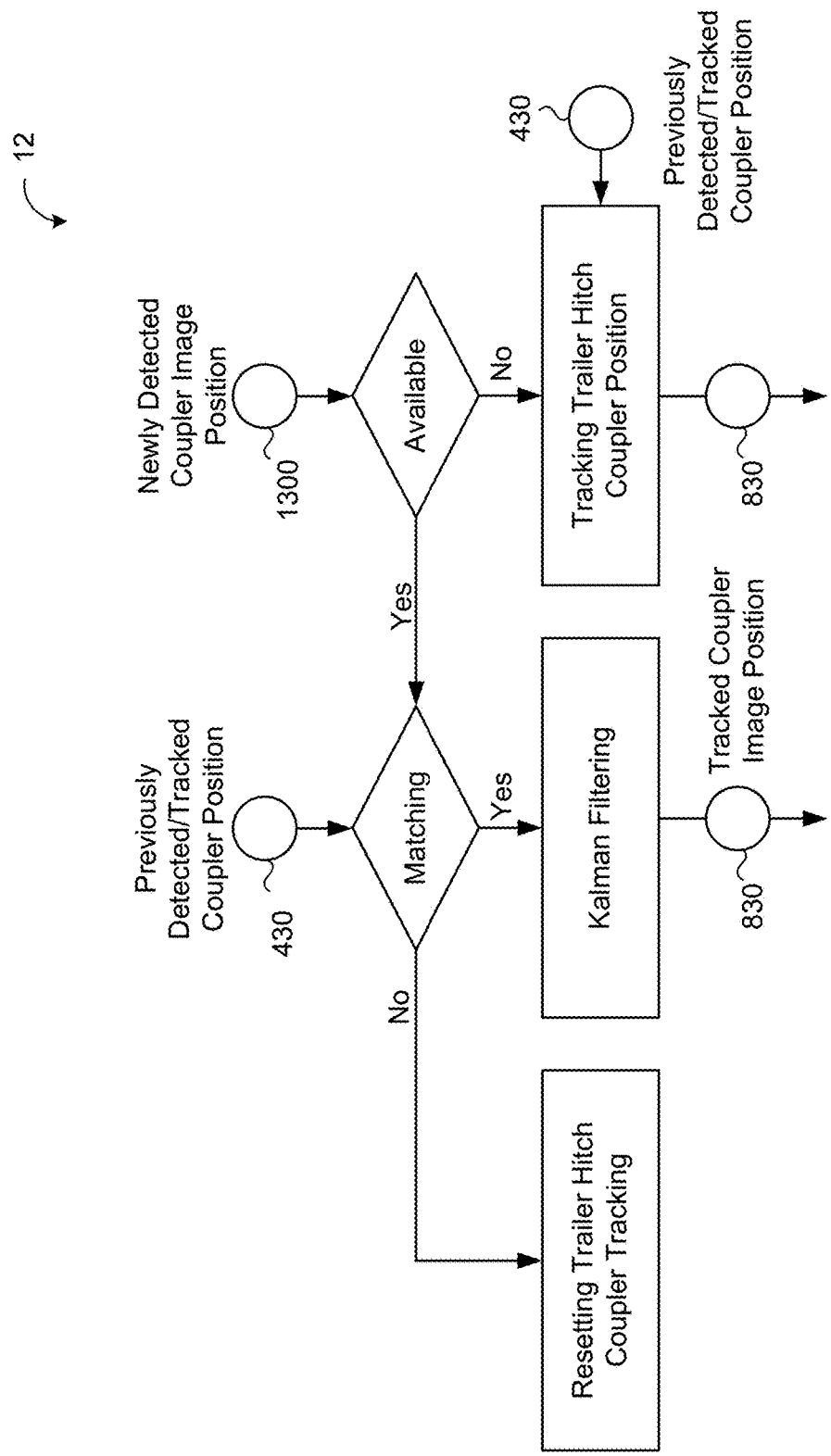
FIG. 13 is a schematic view of trailer hitch coupler estimator that matches newly detected coupler positions with previously detected coupler positions.

Referring now to FIG. 13, alternatively, the trailer assist system 12 may, parallel to the tracking process in following frames, provide a process for detecting the trailer hitch coupler image position that is also conducted in each following frame. When the newly detected coupler position 1300 is not available (i.e., not detected) in the current image frame of captured image data, the initial detected or previously tracked coupler position 430 is tracked as previously described and becomes the tracked coupler position 830. However, when the coupler position is newly detected in the current frame of image data, the newly detected coupler position 1300 is compared with the previously tracked or detected coupler position 430 in the previous frame(s).

When the newly detected coupler image position 1300 and previously detected coupler position 430 match (i.e., are within a threshold distance of each other), the newly detected coupler is determined to be the tracked trailer hitch coupler position and the system performs Kalman filtering to smooth the tracked coupler position and output a tracked coupler image position 830. When the newly detected coupler position 1300 does not match the previously detected/tracked coupler position 430 (i.e., not within a threshold distance of each other), the system determines that the newly detected coupler position 1300 is the final output and the trailer hitch coupler tracking is reset. This alternative may provide a more accurate, stable and/or consistent coupler position 830.

Figure 14:
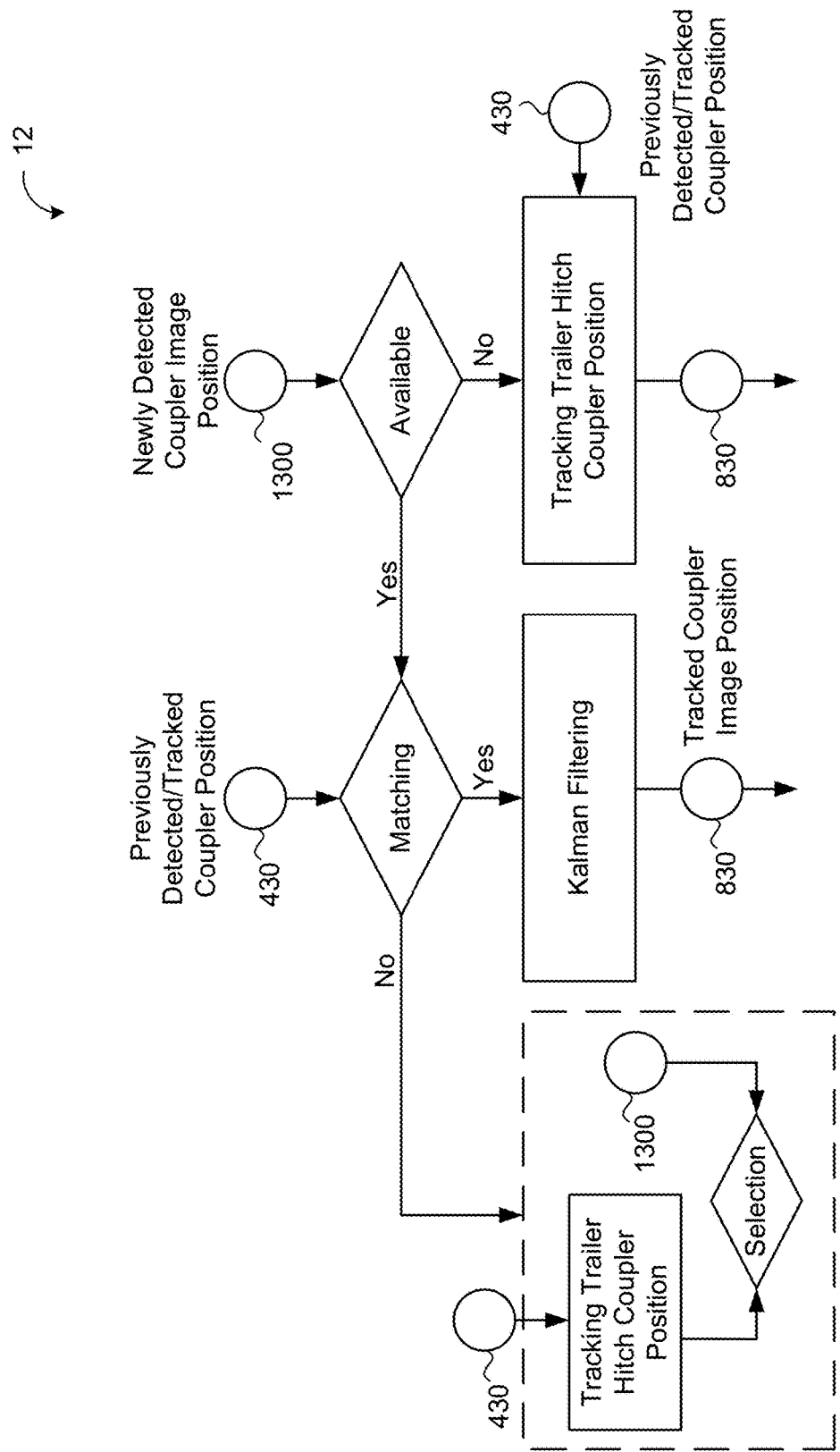
FIG. 14 is a schematic view of a trailer hitch coupler estimator that selects between a newly detected coupler position and a previously detected coupler position.

Referring now to FIG. 14, in another example, the trailer assist system may, parallel to the tracking processing in following frames, provide another process for detecting the trailer hitch coupler image position that is also conducted in each following frame. Similar to as described above with respect to the process of FIG. 13, when the newly detected coupler position 1300 is not available (i.e., not detected) in the current image frame or captured frame of image data, the initial detected or previously tracked coupler position 430 is tracked as previously described and output as the tracked coupler image position 830. When the coupler position is newly detected in the current frame of image data, the newly detected coupler position 1300 is compared with the previously tracked or detected coupler position 430 in the previous frame(s).

Again, similar to as described with respect to the process of FIG. 13, when the newly detected coupler image position 1300 and previously detected coupler position 430 match (i.e., are within a threshold distance of each other), the newly detected coupler position 1300 is determined to be the tracked trailer hitch coupler position 830 and the system performs Kalman filtering to smooth the tracked coupler position 830. However, when the newly detected coupler position 1300 does not match the previously detected/tracked coupler position 430 (i.e., not within a threshold distance of each other), instead, the previous coupler position 430 is tracked, then the system applies a selection strategy to select between the previously tracked coupler position 430 and the newly detected coupler position 1300 to determine the final output. When the newly detected coupler position 1300 is selected, the system resets the trailer hitch coupler tracking to update the information required for the tracking engine.

Thus, the trailer assist system of the present invention provides robust estimation methods for detecting a trailer hitch coupler in an image plane and determining the height and location of the hitch coupler. The accurate trailer hitch coupler height and location may be used to enable other trailer assist systems such as automatically maneuvering a vehicle backing up to a trailer.

Thus, a method of coupler height and location estimation for a vehicular trailer hitching assist system comprises coupler detection, coupler tracking, and coupler height and location estimation. The method includes using one of several matured classification and/or identification methods to detect an initial hitch coupler position in an image plane, which may be further refined by image processing methods. This detected coupler position is then tracked in subsequent frames to build a list of its correspondent relationship. To this end, three alternative tracking strategies incorporated with coupler detection are disclosed to provide an accurate, stable/consistent coupler position. From this built list of the correspondent relationship, one pair of correspondent coupler positions is selected to estimate one candidate of coupler height by using a structure-from-motion technique. This selection-estimation process may be repeated many times to create a set of coupler height candidates. Based on random sample consensus (RANSAC) principles or a full search strategy, a robust determination is disclosed to reject the outliers and find the largest consensus set of coupler heights. The coupler height is re-calculated using the largest consensus set to provide an averaged coupler height. With the robust-estimated coupler height and its corresponding coupler image position, the coupler location in ground is determined through camera projection geometry.

The system may utilize aspects of the trailering assist systems or trailer angle detection systems or trailer hitch assist systems described in U.S. Pat. Nos. 10,755,110; 10,733,757; 10,638,025; 10,586,119; 10,493,917; 10,532,698; 10,552,976; 10,706,291; 10,086,870; 10,160,382; 9,558,409; 9,446,713; 9,085,261 and/or 6,690,268, and/or U.S. Publication Nos. US-2020-0356788; US-2020-0334475; US-2020-0017143; US-2019-0118860; US-2019-0064831; US-2019-0039649; US-2018-0276838; US-2018-0215382 and/or US-2017-0254873, and/or U.S. patent application Ser. No. 16/947,386, filed Jul. 30, 2020, Ser. No. 16/947,178, filed Jul. 22, 2020, and/or Ser. No. 16/946,542, filed on Jun. 26, 2020, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,071,687 and/or 10,099,614, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786; 9,280,202; 10,071,687; 10,099,614; 9,563,951; 9,491,451; 9,604,581; 9,508,014; 10,232,797; 9,580,013; 9,327,693; 9,487,159; 10,027,930; 10,057,544; 10,179,543; 9,445,057; 9,558,409; 9,481,301; 10,025,994; 9,743,002; 9,307,640; 9,707,896; 9,723,272; 9,446,713; 9,761,142; 9,365,162; 9,340,227; 10,089,537; 9,670,895; 10,457,209;

9,319,637; 10,609,335; 10,182,228; 10,182,228; 9,565,342; 9,264,673 and/or 5,786,772, and/or U.S. Publication Nos. US-2014-0327772; US-2014-0218535; US-2014-0247354; US-2014-0211009; US-2014-0168437; US-2014-0168415; US-2014-0025240; US-2014-0028852; US-2014-0005907; US-2013-0215271; and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252; 9,598,016; 9,264,672 and/or 6,642,851, and/or U.S. Publication Nos. US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer hitching assist system, the vehicular trailer hitching assist system comprising:
    a camera disposed at a rear portion of a vehicle and viewing exterior of the vehicle and at least a portion of a trailer rearward of the vehicle, the camera capturing frames of image data representative of the trailer rearward of the vehicle;
    an electronic control unit (ECU) comprising electronic circuitry, the electronic circuitry comprising a processor operable to process frames of image data captured by the camera;
    wherein the ECU, responsive to processing of image data captured by the camera, detects a trailer hitch coupler of the trailer rearward of the vehicle in an initial frame of captured image data, the trailer hitch coupler configured for hitching to a hitch of the vehicle to form a pivoting joint attaching the trailer to the vehicle;
    wherein the ECU, responsive to detecting the trailer hitch coupler in the initial frame of captured image data, estimates (i) an initial height of the detected trailer hitch coupler relative to ground and (ii) an initial location of the detected trailer hitch coupler relative to the hitch of the vehicle;
    wherein the ECU, responsive to detecting the trailer hitch coupler, tracks the position of the trailer hitch coupler in subsequent frames of captured image data as the vehicle reverses toward the trailer;
    wherein the ECU, responsive to estimating the initial height and the initial location of the detected trailer hitch coupler, selects a current frame of captured image data and at least one previously captured frame of captured image data to refine the initial height of the detected trailer hitch coupler relative to ground and the initial location of the detected trailer hitch coupler relative to the hitch of the vehicle; and
    wherein the ECU compares the estimated height and location of the trailer hitch coupler to a previous estimated height and location of the trailer hitch coupler, and wherein, responsive to the comparison, the ECU applies Kalman filtering to the estimated height and location of the trailer hitch coupler.

2. The vehicular trailer hitching assist system of claim 1, wherein the ECU estimates the initial height and the initial location of the trailer hitch coupler based in part on vehicle movement and location information received via a vehicle controller area network (CAN) of the vehicle.

3. The vehicular trailer hitching assist system of claim 1, wherein the ECU detects the trailer hitch coupler using a machine learning algorithm.

4. The vehicular trailer hitching assist system of claim 1, wherein the ECU, responsive to estimating the initial height and the initial location of the trailer hitch coupler, tracks the height and the location of the trailer hitch coupler over multiple frames of image data captured by the camera as the vehicle reverses toward the trailer.

5. The vehicular trailer hitching assist system of claim 4, wherein the ECU tracks the trailer hitch coupler using template matching.

6. The vehicular trailer hitching assist system of claim 1, wherein the ECU generates a plurality of pairs of coupler positions from a plurality of pairs of frames of captured image data, and wherein each pair of frames of captured image data comprises a first frame of captured image data and a second frame of captured image data, and wherein the first frame of each pair of frames of captured image data comprises the current frame of captured image data and the second frame of each pair of frames of captured image data comprises a different previously captured frame of image data.

7. The vehicular trailer hitching assist system of claim 1, wherein the ECU generates a plurality of pairs of coupler positions from a plurality of pairs of frames of captured image data, and wherein each pair of frames of captured image data comprises a first frame of captured image data and a second frame of captured image data, and wherein the second frame of each pair of frames of captured image data is captured prior to the first frame of the respective pair of frames of captured image data.

8. The vehicular trailer hitching assist system of claim 1, wherein the ECU rejects at least one of the height and the location of the trailer hitch coupler using a full search strategy.

9. The vehicular trailer hitching assist system of claim 1, wherein, responsive to the comparison, the ECU selects either the estimated height and location of the trailer hitch coupler or the previous estimated height and location of the trailer hitch coupler.

10. The vehicular trailer hitching assist system of claim 1, wherein the ECU refines the initial height of the detected trailer hitch coupler based on structure-from-motion.

11. A vehicular trailer hitching assist system, the vehicular trailer hitching assist system comprising:
    a camera disposed at a rear portion of a vehicle and viewing exterior of the vehicle and at least a portion of a trailer rearward of the vehicle, the camera capturing frames of image data representative of the trailer rearward of the vehicle;

an electronic control unit (ECU) comprising electronic circuitry, the electronic circuitry comprising a processor operable to process frames of image data captured by the camera;

wherein the ECU, responsive to processing of image data captured by the camera, detects a trailer hitch coupler of the trailer rearward of the vehicle in an initial frame of captured image data, the trailer hitch coupler configured for hitching to a hitch of the vehicle to form a pivoting joint attaching the trailer to the vehicle;

wherein the ECU, responsive to detecting the trailer hitch coupler in the initial frame of captured image data, estimates (i) an initial height of the detected trailer hitch coupler relative to ground and (ii) an initial location of the detected trailer hitch coupler relative to the hitch of the vehicle;

wherein the ECU, responsive to detecting the trailer hitch coupler, tracks the position of the trailer hitch coupler in subsequent frames of captured image data as the vehicle reverses toward the trailer;

wherein the ECU, responsive to estimating the initial height and the initial location of the detected trailer hitch coupler, selects a current frame of captured image data and at least one previously captured frame of captured image data to refine the initial height of the detected trailer hitch coupler relative to ground and the initial location of the detected trailer hitch coupler relative to the hitch of the vehicle;

wherein the ECU, responsive to estimating the initial height and the initial location of the trailer hitch coupler, tracks the height and the location of the trailer hitch coupler over multiple frames of image data captured by the camera as the vehicle reverses toward the trailer; and wherein the ECU tracks the trailer hitch coupler using kernelized correlation filters.

12. The vehicular trailer hitching assist system of claim 11, wherein the ECU, responsive to detecting the trailer hitch coupler, tracks the trailer hitch coupler over multiple frames of image data captured by the camera as the vehicle reverses toward the trailer.

13. The vehicular trailer hitching assist system of claim 12, wherein the ECU merges the tracking of the height and the location of the trailer hitch coupler and the tracking of the trailer hitch coupler.

14. A vehicular trailer hitching assist system, the vehicular trailer hitching assist system comprising:

a camera disposed at a rear portion of a vehicle and viewing exterior of the vehicle and at least a portion of a trailer rearward of the vehicle, the camera capturing frames of image data representative of the trailer rearward of the vehicle;

an electronic control unit (ECU) comprising electronic circuitry, the electronic circuitry comprising a processor operable to process frames of image data captured by the camera;

wherein the ECU, responsive to processing of image data captured by the camera, detects a trailer hitch coupler of the trailer rearward of the vehicle in an initial frame of captured image data, the trailer hitch coupler configured for hitching to a hitch of the vehicle to form a pivoting joint attaching the trailer to the vehicle;

wherein the ECU, responsive to detecting the trailer hitch coupler in the initial frame of captured image data, estimates (i) an initial height of the detected trailer hitch coupler relative to ground and (ii) an initial location of the detected trailer hitch coupler relative to the hitch of the vehicle;

wherein the ECU, responsive to detecting the trailer hitch coupler, tracks the position of the trailer hitch coupler in subsequent frames of captured image data as the vehicle reverses toward the trailer;

wherein the ECU, responsive to estimating the initial height and the initial location of the detected trailer hitch coupler, selects a current frame of captured image data and at least one previously captured frame of captured image data to refine the initial height of the detected trailer hitch coupler relative to ground and the initial location of the detected trailer hitch coupler relative to the hitch of the vehicle; and wherein the ECU rejects at least one of the height and the location of the trailer hitch coupler using random sample consensus (RANSAC).

15. A vehicular trailer hitching assist system, the vehicular trailer hitching assist system comprising:

a camera disposed at a rear portion of a vehicle and viewing exterior of the vehicle and at least a portion of a trailer rearward of the vehicle, the camera capturing frames of image data representative of the trailer rearward of the vehicle, wherein the camera comprises a rear backup camera of the vehicle;

an electronic control unit (ECU) comprising electronic circuitry, the electronic circuitry comprising a processor operable to process frames of image data captured by the camera;

wherein the ECU, responsive to processing of image data captured by the camera, detects a trailer hitch coupler of the trailer rearward of the vehicle in an initial frame of captured image data, the trailer hitch coupler configured for hitching to a hitch of the vehicle to form a pivoting joint attaching the trailer to the vehicle;

wherein the ECU, responsive to detecting the trailer hitch coupler in the initial frame of captured image data, using a machine learning algorithm, estimates (i) an initial height of the detected trailer hitch coupler relative to ground and (ii) an initial location of the detected trailer hitch coupler relative to the hitch of the vehicle;

wherein the ECU, responsive to detecting the trailer hitch coupler, tracks the position of the trailer hitch coupler in subsequent frames of captured image data as the vehicle reverses toward the trailer;

wherein the ECU, responsive to estimating the initial height and the initial location of the detected trailer hitch coupler, selects a current frame of captured image data and at least one previously captured frame of captured image data to refine the initial height of the detected trailer hitch coupler relative to ground and the initial location of the detected trailer hitch coupler relative to the hitch of the vehicle based on structure-from-motion; and wherein the ECU, responsive to estimating the initial height and the initial location of the trailer hitch coupler, tracks the height and the location of the trailer hitch coupler over multiple frames of image data captured by the camera as the vehicle reverses toward the trailer, and wherein the ECU tracks the trailer hitch coupler using kernelized correlation filters.

16. The vehicular trailer hitching assist system of claim 15, wherein the ECU tracks the trailer hitch coupler using template matching.

* * * * *

UNITED STATES PATENT AND TRADEMARK OFFICE
CERTIFICATE OF CORRECTION

PATENT NO. : 11,679,635 B2
APPLICATION NO. : 17/115826
DATED : June 20, 2023
INVENTOR(S) : Liang Zhang It is certified that error appears in the above-identified patent and that said Letters Patent is hereby corrected as shown below:

In the Specification

Column 5
Line 50, "difference e" should be --difference $e$--
Line 54, "condition e<∈." should be --condition $e<\in$.--

Column 6
Line 2, "threshold E," should be --threshold $\in$,--
Line 12, "height 2" should be --height $\hat{Z}_j$--

Signed and Sealed this
Eighteenth Day of July, 2023

Katherine Kelly Vidal
*Director of the United States Patent and Trademark Office*